June 23, 1936.  C. D. RYDER  2,044,997
LIGHT REFLECTING MEANS
Filed Feb. 5, 1935  2 Sheets—Sheet 1
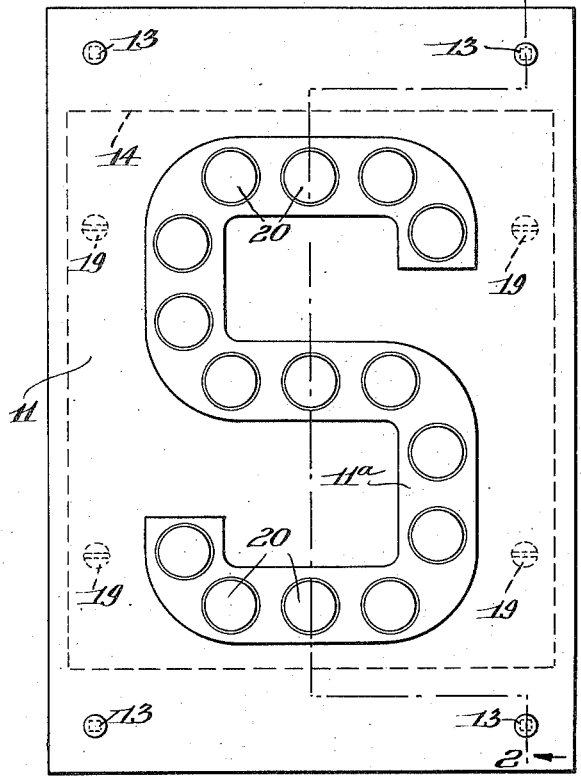
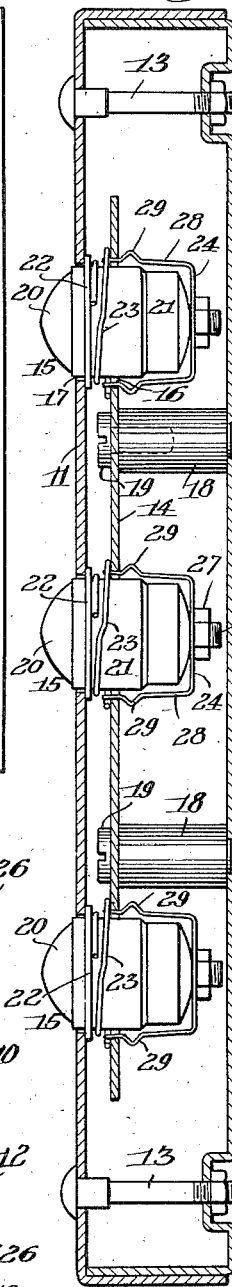
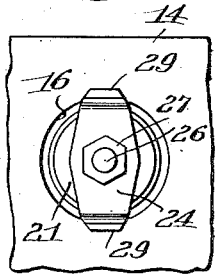
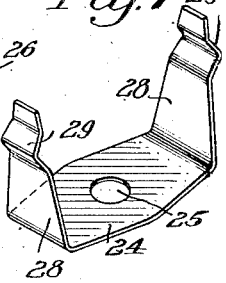
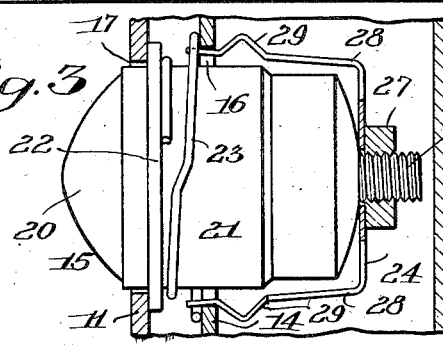
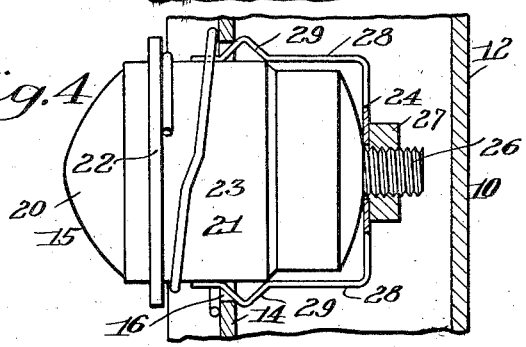
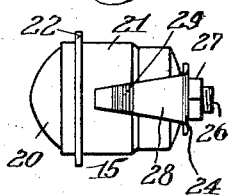
INVENTOR
Charles D. Ryder
BY Edward H. Cumpston
his ATTORNEY June 23, 1936. C. D. RYDER 2,044,997
LIGHT REFLECTING MEANS
Filed Feb. 5, 1935 2 Sheets-Sheet 2
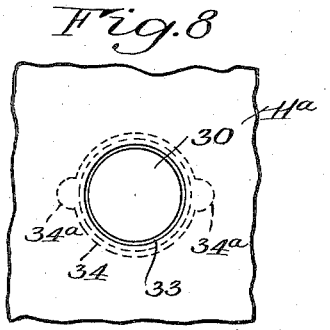
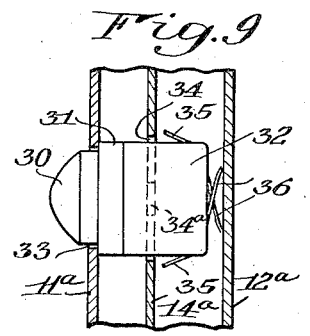
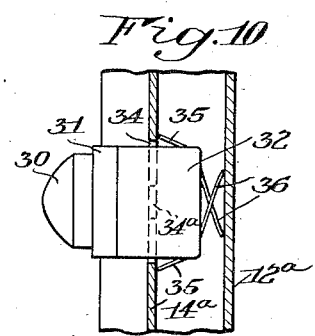
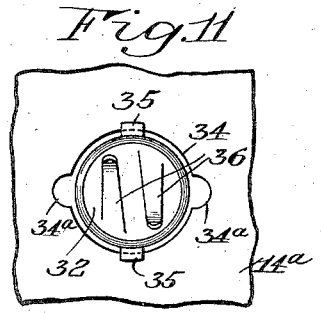
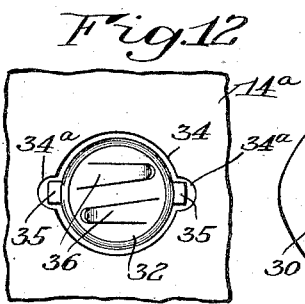
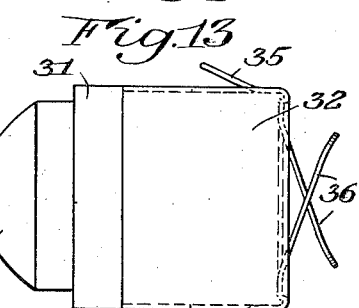
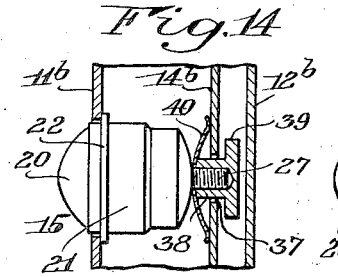
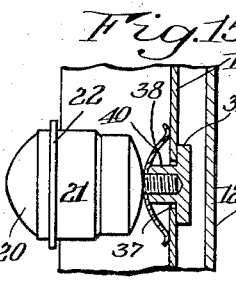
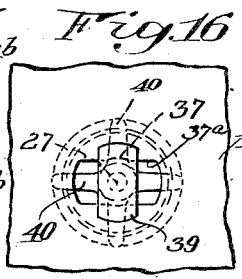
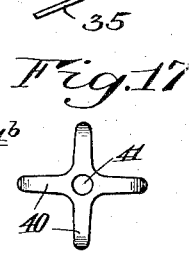
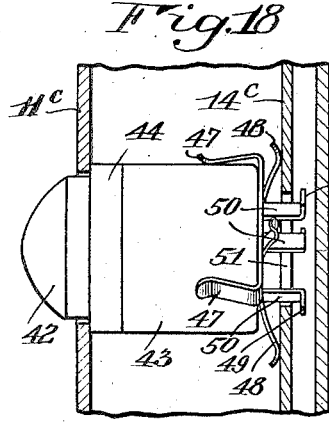
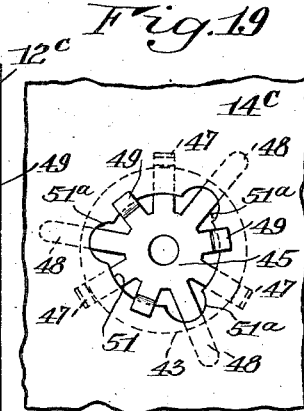
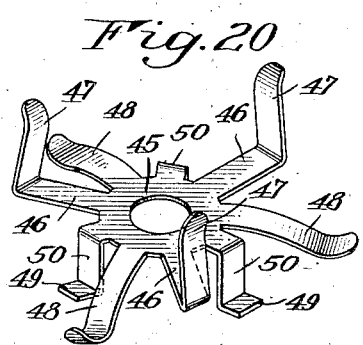
INVENTOR
Charles D. Ryder
BY Edward H. Cumpston
his ATTORNEY Patented June 23, 1936

2,044,997

UNITED STATES PATENT OFFICE 2,044,997

LIGHT REFLECTING MEANS

Charles Daniel Ryder, Covington, Ky., assignor to The National Colortype Company, Bellevue, Ky., a corporation of Kentucky Application February 5, 1935, Serial No. 5,074

20 Claims. (Cl. 40—125)

The present invention relates to light reflecting means of the class adapted for use in connection with various types of signs, advertisements, and the like, which are intended to be rendered visible by reflected light from an external source. Light reflecting devices of this kind may be employed, for example, to form highway warning signals which are rendered visible by the light reflected from the headlights of motor vehicles approaching the signs at night. The form or construction of the sign may be varied to suit different conditions and the light reflecting units can be grouped or arranged to form or simulate one or more characters of any preferred design.

One object of the invention is to provide in a sign of this class practical and simplified means for mounting and supporting the light reflecting units which will facilitate application and removal of the same whereby to reduce the time required for such operations and the expense as well.

A further object of the invention is to provide in a highway sign of the class described as simplified and efficient supporting structure which can be manufactured at a relatively low cost and in which the light reflecting units or elements can be conveniently and accurately placed and protected while in use.

A further object of the invention is to provide an improved individual mounting or holding device for the light reflecting element connected therewith to form a unit detachably positioned upon the supporting structure of the sign.

A further object of the invention is to provide improved holding or mounting devices for the light reflecting elements having resilient means for yieldably maintaining them in assembled position upon the sign.

A further object of the invention is to provide an improved sign comprising display and supporting sections for the light reflecting elements in which arrangement the display section can be removed for repairs when required without disturbing the supporting section, from which each light reflecting element and its holder or mounting member can be removed as a unit and replaced by a similar unit from time to time.

A further object of the invention is to provide improved individual mounting or holding devices for the light reflecting elements having resilient means associated with the supporting and display sections for said elements and permitting the elements each to have a limited axial movement in opposite directions to compensate for any inaccuracies in the spacing of the display and supporting sections.

To these and other ends the invention resides in certain improvements and combinations of parts, all as will be hereinafter more fully described, the novel features being pointed out in the claims at the end of the specification.

In the drawings:

Fig. 1 is a front elevation of a sign or unit embodying one form of the invention;

Fig. 2 is a sectional elevation on line 2—2 of Fig. 1, drawn to an enlarged scale;

Fig. 3 is a fragmentary sectional elevation on an enlarged scale illustrating the normal operating position of one of the light reflecting elements;

Fig. 4 is a similar view with the front plate of the housing removed and illustrating the position automatically assumed by the light reflecting unit or element upon removal of said plate;

Fig. 5 is a rear end view of one of the light reflecting elements of Fig. 2 as it appears when viewed from the rear of the intermediate supporting plate of the sign when removed from the housing;

Fig. 6 is a view showing one of the reflecting elements removed from the sign with the holder for said element shown thereon;

Fig. 7 is a detailed perspective view of one of the holders drawn to an enlarged scale;

Fig. 8 is a fragmentary front elevation of a modification in which the resilient means for urging the light reflecting element is placed in rear of the intermediate supporting plate;

Fig. 9 is a vertical section taken centrally through the light reflecting element of Fig. 8, showing it in its normal operating position;

Fig. 10 is a similar view with the front supporting plate removed and showing the position automatically assumed by the light reflecting element upon such removal;

Fig. 11 is a view looking at the rear of the light reflecting element and the intermediate supporting plate therefor;

Fig. 12 is a similar view showing the element after it has been rotated through an angle of 180° into position to be withdrawn from said plate;

Fig. 13 is a side view of the light reflecting element shown in Figs. 9 and 10 drawn to an enlarged scale;

Fig. 14 is a fragmentary sectional elevation through a sign or unit of a sign showing another modification of the holding device and resilient means for urging the reflecting element into engagement with the front plate of the sign or housing for the light reflecting elements;

Fig. 15 is a similar view with the front plate removed and showing the position assumed by the light reflecting element upon such removal;

Fig. 16 is an elevation as viewed from the left of Fig. 14;

Fig. 17 is a detailed view of the resilient element shown in Fig. 14 for holding the light reflecting element in position upon the front or display plate of the sign;

Fig. 18 is a fragmentary sectional elevation through a sign disclosing a unitary device for supporting and urging the light reflecting element in engagement with the front display plate of the sign;

Fig. 19 is a view looking at the rear of the intermediate plate shown in Fig. 18 on which the light reflecting elements are supported upon removal of the front display plate, and Fig. 20 is a perspective view of the resilient holding element shown in Fig. 18.

The same reference numerals throughout the several views indicate the same parts.

In the present embodiment of the invention a housing designated generally by the reference character 10 is provided within which may be secured and displayed the desired number of light reflecting units or elements arranged in any preferred order corresponding to a selected design or disposed in such a manner as to constitute one or more characters, letters, or words forming a useful sign or signal.

The housing preferably comprises front and rear telescoping sections 11 and 12 detachably connected one with another as for example by means of the bolts 13 as shown in Fig. 2.

Positioned within the housing in rear of the front wall thereof is an intermediate supporting plate 14 for the light reflecting elements indicated generally at 15, said plate and wall having alined openings 16 and 17 for receiving the units as shown in Fig. 2. The supporting plate is preferably carried by a plurality of post-like members 18 having their rear ends suitably connected with the rear wall 12 of the housing, screws 19 being provided to secure the plate upon the post-like members. The holes in the plate through which the screws extend are preferably made slightly larger in diameter than the screws to permit the plate to be shifted laterally in one direction or another to properly aline the openings therein for receiving the reflecting elements with the corresponding openings in the front wall of the housing.

The light reflecting units or elements 15 disposed within the housing may be of any suitable or preferred type, each preferably comprising a lens 20 secured within a casing 21, the lens having a suitable reflector, not shown, for reflecting the light rays passing through the lens. The units are each provided with an abutment 22 which may be in the form of a shoulder or flange disposed either on the lens element or the casing containing the same.

Suitable resilient means is provided for urging the abutment of the light reflecting element into engagement with the rear side of the front supporting member or wall 11 whereby to normally maintain said element in proper relation with respect to said supporting member. The resilient means preferably comprises a coiled spring 23 surrounding the element between the supporting members therefor, one end of the spring bearing on the abutment 22 and the other on the supporting plate 14, as shown in Fig. 2.

The light reflecting elements shown in Figs. 1 to 6, inclusive, are provided with mounting or holding devices 24 for supporting them upon the intermediate plate 14, both before and after the front section of the housing has been removed from the rear section as indicated in Fig. 4. The mounting devices are substantially U-shape in construction and may be formed of any suitable resilient or spring material. They are provided with openings 25 for receiving the threaded extensions 26 of the light reflecting elements which are preferably formed integral with the lens casing 21 of said elements.

The intermediate portions 24 of the mounting devices are clamped upon the rear ends of the light reflecting elements by the nuts 27 as shown in Figs. 2 and 6. The arms 28 of the mounting device extend along opposite sides of the light reflecting element and have their extremities positioned in the openings 16 of the intermediate plate 14 as best shown in Fig. 3. The arms are provided adjacent their ends with outwardly struck cam stops 29, the inclined front face portions of which through cooperation with the plate 14 serve to cam the arms inwardly upon the reflecting element when the latter is moved outwardly in the openings 16 by the spring 23, upon removal of the front section 11 from the housing. The stops in the position shown in Fig. 4 serve to limit outward movement of the light reflecting element under the pressure of the spring 23.

The arrangement of the parts is such, however, as to permit of removal of the light reflecting elements and holding devices thereon outwardly through the openings of the supporting plate 14 without having to remove the plate from the housing. This can be done after the front cover or display plate has been removed from the housing by gripping the front end of the light reflecting element and rocking or shifting it laterally to one side of the opening, at which time the stop 29 at the side of the element in the direction of which the latter is being moved will be shifted rearwardly thus affording sufficient clearance to permit the opposite stop to be moved forwardly through the opening. Then by rocking or shifting the light reflecting element in an opposite direction the other stop can likewise be withdrawn through the opening, during which time the rear portion of the first stop to be removed will engage the front side of the plate and permit said element to pivot thereon while continuing to withdraw it through the opening.

In assembling the light reflecting elements upon the supporting plate 14 they may be inserted within the openings thereof either before or after applying the mounting or holding devices to the units. If the mounting devices are applied to the light reflecting elements before positioning said elements upon the supporting plate they can be assembled upon the plate by pushing them through the openings and at the same time moving them laterally, first in one direction and then in another to permit the stops 29 to pass one at a time through the openings. On the other hand if preferred, the light reflecting elements with the springs 23 thereon may be inserted through the openings 16 before placing the supporting plate within the housing, in which case the mounting devices can be applied from the rear of the supporting plate and secured by screwing the nuts 27 upon the threaded extensions 26 of said elements. The mounting or holding devices serve to support and maintain the light reflecting elements in proper position upon the supporting plate after removal of the front section of the housing as shown in Fig. 4.

In replacing the front section of the housing it will be guided into position by the side walls of the rear section, during which time the rear face of the front section will engage the abutments 22 of the light reflecting elements and move the latter rearwardly against the resistance of the springs 23 lying between the front section and the intermediate plate 14.

Whenever it may be desired to repaint or repair the front or display section of the housing it can be readily removed and a similar section substituted therefor without having to remove or interfere with the light reflecting elements. In this way the signs may be kept in good condition and substantially in constant use.

By constructing and applying the mounting or holding device to the light reflecting element as shown in Fig. 4 it does not have to be removed therefrom either when applying said element to or removing it from the supporting plate whereby a considerable saving in the cost of assembling the parts and in the upkeep of the sign is afforded.

In the modification shown in Figs. 8 to 13, inclusive, the housing for the light reflecting elements is substantially the same as that shown in Figs. 1 and 2, the front and rear sections being indicated at 11a and 12a, respectively, and the intermediate plate at 14a. In this modification the light reflecting element preferably comprises a lens 30 having an annular portion 31 thereon, the rear portion of the lens being disposed within the casing 32 and provided with a reflector, not shown. The light reflecting element is supported in the front and rear alined openings 33 and 34 of the front and intermediate plate members 11a and 14a, respectively, the rear opening having at its opposite sides communicating openings or slots 34a for the passage of the outwardly struck tongue-like stops 35 of the lens casing 32 when assembling the reflecting elements upon the intermediate plate, before applying the front section 11a to the housing. After said elements have been inserted through the openings 34 with the stops in the position shown in Fig. 12, they are given a quarter turn to position the stops as shown in Fig. 11. The collar or annular portion 31 of the light reflecting element is urged in engagement with the rear face of the front plate 11a by suitable resilient means, such as the oppositely extending leaf springs 36, preferably struck outwardly from the rear wall of the casing 32 and engaging the rear section 12a of the housing as shown in Figs. 9 and 10.

After all of the light reflecting elements have been assembled upon the intermedate plate 14a in the manner described, the front plate or housing section 11a is applied to the rear section and secured thereon preferably by means of suitable bolts as shown in Fig. 2. Before applying the front section of the housing upon the rear section the springs 36 will hold the reflecting elements in the position shown in Fig. 10, from which further outward movement of the elements is prevented by the contacting of the stops 35 with the intermediate plate 14a. However when moving the front section of the housing into position upon the rear section it will, through engagement with the annular portions 31 of the reflecting elements effect rearward movement of the elements, thus causing the stops to move into the position shown in Fig. 9 and the springs 36 to yieldingly urge said elements in engagement with the display member 11a.

Thus as in the case of the light reflecting elements shown in Figs. 1 to 4, those of the modification shown in Figs. 9 and 10 can be inserted through and assembled upon the intermediate supporting plate 14a and removed therefrom without removing any of the parts of said elements one from another. It will be seen, therefore, that the time required to assemble the light reflecting elements of the modification shown in Figs. 8 and 13 within the sign and to remove them therefrom is reduced to a minimum.

In the modification shown in Figs. 14 to 17, inclusive, the housing for the light reflecting elements is similar to that shown in Figs. 1 and 2, with the difference that the intermediate plate is positioned somewhat further back within the housing, since the body of the light reflecting element is not extended through the plate. In this modification the front and rear housing sections are shown, in part, and designated by the reference characters 11b and 12b, respectively, while the intermediate supporting plate is indicated at 14b. The light reflecting elements, which are the same as those shown in Figs. 1 to 6, inclusive, have been given the same reference characters.

The threaded portion 27 of the light reflecting element is extended through the opening 37 in the intermediate plate to receive the nut or holding device 38, also extending through the opening and having a part 39 thereon forming a stop for limiting outward movement of the reflecting element under the pressure of the spring 40, as shown in Fig. 15, in which the front section of the housing shown in Fig. 14 has been removed from the rear section. The opening 37 is provided with communicating slots 37a whereby it is elongated to permit the part 39 to be moved therethrough when assembling the light reflecting element upon and removing it from the plate 14b. The spring 40 preferably comprises a hub-like portion from which extends a plurality of resilient arms preferably four in number, as shown in Fig. 17. The hub portion is apertured at 41 to permit it to be inserted upon the threaded extension 27 of the light reflecting element on which it is clamped by the nut 38. Normally the spring serves to urge the abutment 22 of the light reflecting element in engagement with the rear face of the display plate 11b, the part 39 of the light reflecting element being spaced from the rear face of said plate, as shown in Fig. 14. Upon removal of the display plate or front section of the housing the spring will move the reflecting element outwardly to the position shown in Fig. 15, in which said elements will be firmly held ready to enter the holes in the front section of the housing when it or another section corresponding thereto is moved into position upon the rear section, at which time the light reflecting elements will be returned to normal position as shown in Fig. 14.

It will be understood that the intermediate supporting plate 14b may be detachably mounted within the housing, in the same manner as the plate 14 of Fig. 2 and that the individual light reflecting elements thereon can readily be applied to the plate by inserting the part 39 through the opening therein and turning said elements to position said part as shown in Fig. 16.

In the modification shown in Figs. 18 to 20, inclusive, the reflecting unit housing is also similar to that shown in Figs. 1 and 2, the front and rear sections of which are designated by the reference characters 11c and 12c, respectively, and the intermediate plate of which is indicated at 14c. The intermediate plate may be detachably supported within the housing in any suitable manner, for example, as shown in Figs. 1 and 2.

The light reflecting elements of this modification each includes a lens 42 and a casing 43 therefor having a reflector, not shown. An annular shoulder or flange 44 for engaging the rear face of the display plate to limit outward displacement of the light reflecting element is provided, which may constitute a part of the lens or of the casing as preferred. The mounting or holding device for the light reflecting element is supported on the intermediate plate and permits said elements to be readily applied thereto or detached therefrom without having to remove said plate from the housing. The mounting or holding device, which is best shown in Fig. 20, serves not only as a holder for the light reflecting element but is adapted also to urge it into engagement with the rear face of the front plate 11c and to limit its outward movement with respect to the intermediate plate when the front plate or housing section is removed from the rear section. The mounting or holding element, which is formed of yieldable or spring material, comprises a central hub-like body portion 45 having laterally extending arms 46 with bent-up portions 47 for receiving and gripping the sides of the casing 43 of the light reflecting element, as shown in Fig. 18, the rear end portion of said element being preferably seated on the arms and the central body portion 45 of the holder.

The holder or mounting device is provided with three laterally and rearwardly extending resilient arms 48 which engage the front face of the intermediate plate for the purpose of urging the annular shoulder 44 of the light reflecting element into engagement with the front plate of the sign, as shown in Fig. 18. The resilient arms are deflected under the pressure exerted by the front plate on the reflecting element and when the plate is removed said element will be moved forwardly of the intermediate plate until the offset portions 49 of the rearwardly extending members 50 of the holder engage the rear face of the intermediate plate, said members being extended through an opening 51 in the plate as shown in Fig. 18. The holder can be readily applied to and removed from the plate 14c since the opening 51 of the plate is provided with communicating slots 51a for the passage of the offset portions 49 of the members 50, which can be moved to the position shown in Fig. 19 by rotating the light reflecting element in one direction or another after insertion of the parts 49 through the opening 51. The holders for the light reflecting elements may be applied to the intermediate plate either before or after securing said plate within the housing.

In each of the several different mounting or holding devices shown and described, the arrangement is such that when the front display plate or housing section is removed the resilient means will move the light reflecting element outwardly until the stop means associated with the element engages the intermediate or supporting plate, after which the light reflecting elements will be entirely supported by the plate in position thereon to permit their front ends to enter the openings of the front section of the housing when assembling it upon the rear section.

I claim:

1. In a sign of the class described, detachably associated display and supporting members having alined openings therein, a light reflecting element extending rearwardly of said display member and having its front end positioned within the opening thereof, said element extending through the opening of the supporting member and rearwardly of said member and having an abutment normally engaging the display member to hold the element against outward movement, resilient means on said light reflecting element in advance of the supporting member for urging said abutment in engagement with the display member, and stop means on said light reflecting element disposed rearwardly of the supporting member in spaced relation thereto, said light reflecting element upon detachment of the display member from the supporting member being automatically moved by the resilient means to a position at which the stop means will engage the rear side of the supporting member and maintain the light reflecting element thereon.

2. In a sign of the class described, detachably associated display and supporting members having alined openings therein, a light reflecting element extending through the opening of the supporting member forwardly and rearwardly of the latter and into the opening of the display member, said element having an abutment normally engaging the display member to limit outward movement of the element, resilient means associated with said members for urging the abutment in engagement with the display member, and stop means connected with the light reflecting element normally spaced from and in rear of the supporting member, said light reflecting element and stop means being movable as a unit by said resilient means to position the stop means in engagement with the rear side of the supporting member upon detachment of said members one from another.

3. In a sign of the class described, detachably associated display and supporting members having alined openings therein, a light reflecting element extending through the opening of the supporting member forwardly and rearwardly of said member and into the opening of the display member, said element having an abutment normally engaging the display member to limit outward movement of the element, resilient means between said supporting and display members in engagement with said abutment and operating to urge said abutment in engagement with the display member, and spaced stop members located on the light reflecting element and extending rearwardly of and in spaced relation to said supporting member, said element and stop members being moved by said resilient means as a unit outwardly to a predetermined position within the opening of the supporting member upon detachment of one of said members from the other and being limited in its outward movement at said position by engagement of the stop members with the supporting member, said light reflecting element being removable from said supporting member by rocking it in one direction within the opening thereof to withdraw one of the stops through said opening and subsequently rocking it in an opposite direction to withdraw another stop through said opening.

4. In a sign of the class described, detachably associated display and supporting members having alined openings therein, a light reflecting element extending through the opening of the supporting member forwardly and rearwardly of said member and into the opening of the display member, said element having an abutment normally engaging the display member to limit outward movement of the element, resilient means in advance of the supporting member and in engagement with said element and operating to urge said abutment in engagement with the display member, and stops located on the light reflecting element rearwardly of and in spaced relation to said supporting member, said element and stops upon detachment of one of said members from the other being moved as a unit by said resilient means outwardly to a position at which it is held by engagement of the stops with the supporting member.

5. In a sign of the class described, detachably associated display and supporting members having alined openings therein, a light reflecting element extending through the opening of the supporting member into the opening of the display member, said element having an abutment normally engaging the display member to limit outward movement of the element, resilient means operating to urge the abutment in engagement with the display member, oppositely disposed parts extended longitudinally of said element in rear of the supporting member, said parts having their front ends extended within the opening of the supporting member and having laterally projecting stops disposed rearwardly of the supporting member, said light reflecting element being movable by said resilient means to position the stops in engagement with the supporting member upon detachment of said members one from another, said element being movable on the supporting member to disengage the stops therefrom to permit said element and the stops to be moved as a unit forwardly through the opening of the supporting member.

6. In a sign of the class described, detachably associated display and supporting members having alined openings therein, a light reflecting element extending through the opening of the supporting member into the opening of the display member, said element having an abutment normally engaging the display member to limit outward movement of the element, resilient means operating to urge the abutment in engagement with the display member, and holding means for said light reflecting element engaging said supporting member comprising a substantially U-shaped member secured on said element and having the extremities of its side portions extending within the opening of the supporting member, said side portions having stops thereon in rear of the supporting member, said light reflecting element being movable by said resilient means outwardly in the opening of the supporting member to position the stops in engagement with the supporting member upon detachment of said members one from another.

7. In a sign of the class described, detachably associated display and supporting members having alined openings therein, a light reflecting element extending through the opening of the supporting member into the opening of the display member, said element having an abutment normally engaging the display member to limit outward movement of the element, resilient means operating to urge the abutment in engagement with the display member, mounting means for supporting said light reflecting element in the opening of said supporting member comprising a part secured on said element in rear of the supporting member and having yieldable forwardly extending arms, the ends of which extend within the opening of the supporting member in spaced relation to said element, said arms having cams thereon and said element being moved by said resilient means outwardly in the opening of the supporting member upon detachment of said display and supporting members one from another during which movement the cams cooperate with the supporting member to move the ends of said arms inwardly upon the light reflecting element and operate to limit outward movement of said element to a predetermined position, the light reflecting element being movable from said position in one direction to withdraw one of the cams through the opening of the supporting member and movable in another direction to withdraw another of the cams through said opening whereby to release the light reflecting element for removal from said supporting member.

8. In a sign of the class described, detachably associated display and supporting members having alined openings therein, a light reflecting element extending through the opening of the supporting member forwardly and rearwardly of said member and into the opening of the display member, said element having an abutment normally engaging the display member to limit outward movement of the element, resilient means in advance of the supporting member for urging the abutment in engagement with the display member, and a holding device for said light reflecting element cooperating with said supporting member to support the light reflecting element in operating position thereon, said light reflecting element and holding device being moved as a unit from operating position by said resilient means outwardly to a predetermined position upon detachment of one of said members from another and being limited in its outward movement at said position by engagement of said holding device with the rear side of said supporting member.

9. In a sign of the class described, detachably associated display and supporting members having alined openings therein, a light reflecting element extending through the opening of the supporting member forwardly and rearwardly of said member and into the opening of the display member, said element having an abutment normally engaging the display member to limit outward movement of the element, resilient means associated with said members for urging the abutment in engagement with the display member, and a holding device for said light reflecting element disposed rearwardly of said member and having spaced parts engaging said supporting member to hold the light reflecting element in operating position thereon, said parts having stops thereon and said light reflecting element and holding device being moved by said resilient means as a unit to position said stops in engagement with the supporting member upon detachment of said members one from another.

10. In a sign of the class described, detachably associated display and supporting members having alined openings therein, a light reflecting element extending through the opening of the supporting member forwardly and rearwardly of said member and into the opening of the display member, said element having an abutment normally engaging the display member to limit outward movement of the element, resilient means associated with said members for urging the abutment in engagement with the display member, and a holding device for said light reflecting element mounted thereon rearwardly of the supporting member and having parts engaging the supporting member within the opening thereof to maintain the light reflecting element in operating position upon the supporting member, said light reflecting element and holding device being movable as a unit by said resilient means outwardly in said opening to a predetermined position upon detachment of said display and supporting members one from another and being checked at said position through engagement of a portion of the holding device with the supporting member.

11. In a sign of the class described, a supporting plate having an opening therethrough, a display plate detachably associated with the supporting plate and having an opening alined with the opening of the supporting plate, a light reflecting element, stop means on said element, said element and stop means being insertable as a unit from the front side of the supporting plate through the opening thereof to position the stop means at the rear side of said plate before applying the display plate to the sign, and resilient means in advance of the supporting plate for urging said element outwardly in the opening of the supporting plate, the opening in the display plate receiving the outer end of the light reflecting element when positioning the display plate upon the sign, said display plate when being moved to final position upon the sign forcing the reflecting element rearwardly in the opening of the supporting plate and moving the stop means from and rearwardly of the supporting plate.

12. In a sign of the class described, a supporting plate having an opening therethrough, a display plate detachably associated with the supporting plate and having an opening alined with the opening of the supporting plate, a light reflecting element, a holder for said element secured thereon, said element and holder being inserted through the opening of the supporting plate from the front side thereof, and resilient means in advance of the supporting plate operating to urge the light reflecting element in contact with the display plate with its front end in the opening thereof, said resilient means upon removal of the display plate from the sign moving the holder and the light reflecting element forwardly upon the supporting member to a predetermined position at which said element is maintained upon the supporting member by engagement of said holder therewith.

13. In a sign of the class described, a supporting plate having an opening therethrough, a display plate detachably associated with the supporting plate and having an opening alined with the opening of the supporting plate, a light reflecting element, a holder for said element secured thereon and provided with stop means, said element and holder being inserted within the opening of the supporting plate as a unit with the stop means at the rear side of the supporting plate, and resilient means in advance of the supporting plate operating to urge the light reflecting element in contact with the display plate with its front end in the opening thereof, said resilient means upon removal of the display plate from the sign moving the holder and light reflecting element forwardly upon the supporting plate to a position at which the stop means will engage the supporting plate to limit outward movement of said element.

14. In a sign of the class described, detachably associated display and supporting members having alined openings therein, a light reflecting element positioned in the opening of the supporting member and extending within the opening of the display member, said element including a lens and a casing therefor, said casing having outwardly struck parts thereon spaced rearwardly of the supporting member, and resilient means associated with said light reflecting element and normally urging it in engagement with said display member, said element being moved by said resilient means to position said parts in engagement with the supporting member upon detachment of said members one from another, said light reflecting element and said parts being removable as a unit forwardly through the opening of the supporting member after detachment of said members one from another.

15. In a sign of the class described, a housing including front and rear detachably associated walls, said front wall having a plurality of openings therein, a supporting plate within the housing having openings alined with the openings of said front wall, light reflecting elements supported within the openings of said plate and having their front ends in the openings of said front wall, said elements each including a lens and a casing therefor, said casing having outwardly struck parts spaced rearwardly of the supporting plate, resilient means interposed between the rear wall and each of said light reflecting elements and operating to urge said elements in engagement with said front wall, the resilient means of each of said elements operating to move the element forwardly within the opening of the supporting plate upon detachment of said walls one from another whereby to position said parts in engagement with the supporting plate, said elements each being removable with said parts thereon forwardly through its corresponding opening in the supporting plate after detaching said walls one from another.

16. In a sign of the class described, detachably associated display and supporting members having alined openings therein, a light reflecting element interposed between said members and extending within the opening of the display member, resilient means interposed between said supporting member and said light reflecting element and operating to urge the latter in engagement with the display member, and a mounting device for said light reflecting element including parts disposed within the opening of the supporting member, said mounting device having stop means normally spaced from and in rear of the supporting member, said resilient means upon detachment of said members one from another operating to move the light reflecting element and said mounting device as a unit forwardly upon the supporting member to a position at which the stop means will engage the supporting member in which position the light reflecting element will be held by said mounting device through cooperation with the resilient means.

17. In a sign of the class described, detachably associated display and supporting members having alined openings therein, a light reflecting element interposed between said members and extending within the opening of the display member, resilient means interposed between said supporting member and said light reflecting element and operating to urge the latter in engagement with the display member, and a mounting device connected with the light reflecting element and operating to secure the resilient means thereon, said mounting device extending through the opening of the supporting member and having a part normally spaced from and in rear of the supporting member, said resilient means upon detachment of said display and supporting members one from another operating to move the light reflecting element and said mounting device as a unit in a forward direction upon the supporting member to a position at which said part will engage the supporting member and cooperate therewith to maintain the light reflecting element upon the supporting member.

18. In a sign of the class described, detachably associated display and supporting members having alined openings therein, a light reflecting element interposed between said members and extending within the opening of the display member, said element having an extension on its rear end, a spring on said extension engaging the supporting member and operating to urge the light reflecting element in engagement with the display member, and a mounting device on said extension projecting rearwardly through the opening of the supporting member and having stop means normally spaced rearwardly of the supporting member, said spring upon detachment of said display and supporting members one from another operating to move the light reflecting element and said mounting device forwardly of the supporting member to a position at which the stop means will engage the supporting member, in which position the light reflecting element will be held by the spring after detachment of said supporting and display members one from another.

19. In a sign of the class described, detachably associated display and supporting members having oppositely disposed openings therein, a light reflecting element between said members having its front end in the opening of the display member and having an abutment engaging the display member, and a unitary holder for said light reflecting element disposed at the rear end thereof and having resilient means engaging the supporting member and urging the light reflecting element in engagement with the display member, said holder having stop means extending rearwardly therefrom through the opening of the supporting member and provided with offset portions normally spaced from the supporting member, said light reflecting element being moved by said resilient means forwardly of the supporting member to a position at which said offset portions will engage the supporting member upon detachment of said members one from another, said holder cooperating with the supporting member when in said position to support the light reflecting element in advance of the supporting member.

20. In a sign of the class described, detachably associated display and supporting members having oppositely disposed openings therein, a light reflecting element between said members having its front end in the opening of the display member and having an abutment engaging the display member, and a unitary holder for said light reflecting element disposed at the rear end thereof comprising a body portion having arm-like members receiving the light reflecting element and extending along the sides thereof to support said element in position between the display and supporting members, said body portion having spaced resilient members engaging the supporting member and operating to urge the abutment of the light reflecting element in engagement with the display member, said body portion having one or more members extending rearwardly from the holder through the opening of the supporting member and provided with offset stop portions normally spaced rearwardly of the supporting member, said light reflecting element being moved by said resilient members forwardly of the supporting member to a position at which said offset stop portions will engage the supporting member to limit outward movement of the light reflecting element, said light reflecting element and holder being rotatable from said position to a position at which the offset stop portions will disengage the supporting member whereby to permit the light reflecting element and holder to be withdrawn from the supporting member.

CHARLES DANIEL RYDER.